July 12, 1932. C. E. SCHLENKER 1,867,385
MECHANICAL MOVEMENT
Filed June 11, 1927 2 Sheets-Sheet 1
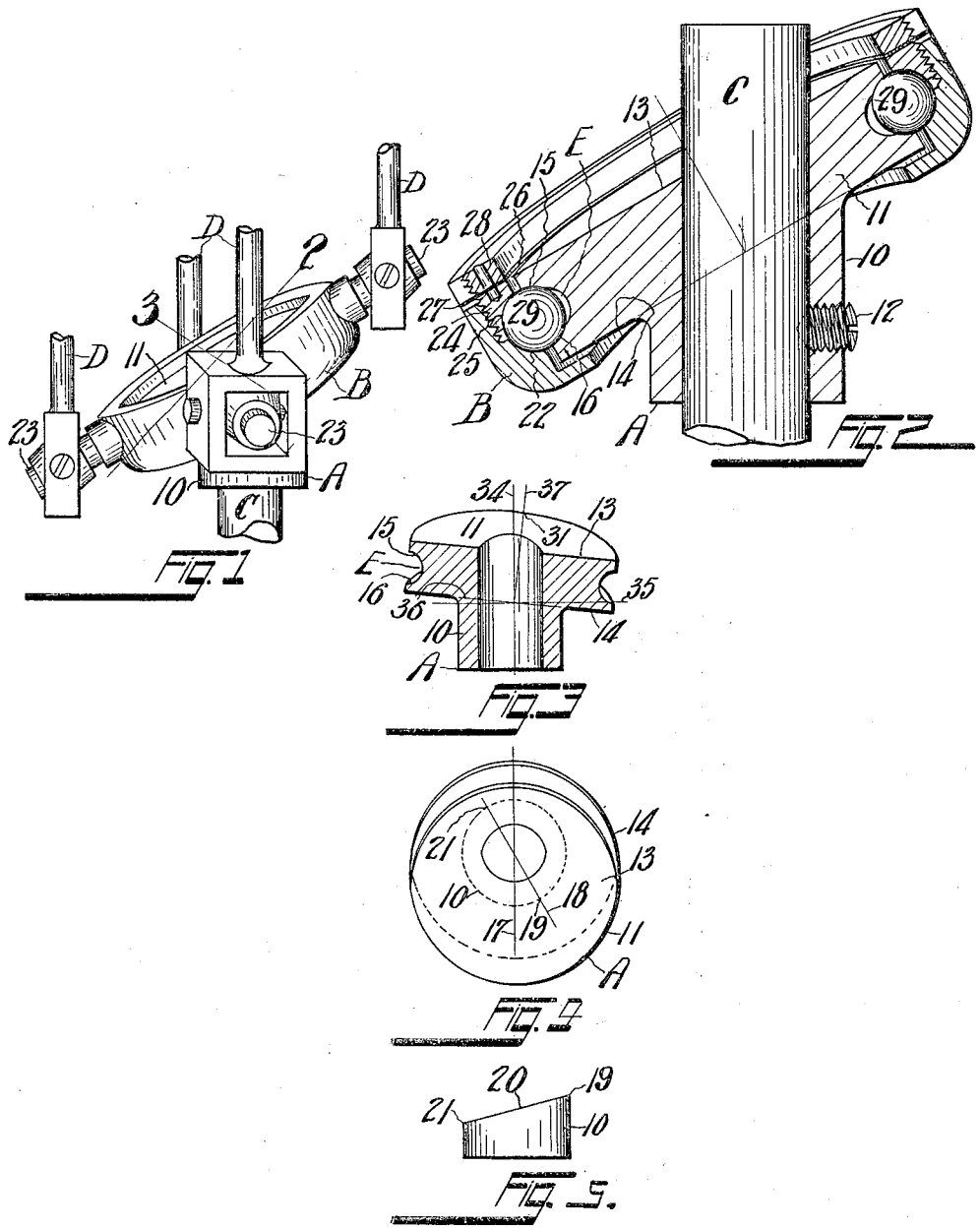
Chas. E. Schlenker
C.F. Heinkel.
Attorney Patented July 12, 1932

1,867,385

UNITED STATES PATENT OFFICE

CHARLES E. SCHLENKER, OF CLEVELAND, OHIO, ASSIGNOR TO WESTERN RESERVE AIR MOTORS CORPORATION, A CORPORATION OF OHIO

MECHANICAL MOVEMENT

Application filed June 11, 1927. Serial No. 198,184.

My invention relates to mechanical movements such as transmit motion from one member to another or convert rotary motion into lineal motion or lineal motion into rotary motion.

One of the objects of my invention is a simple and efficient means of transmitting motions or converting them as defined above with the fewest number of parts, wherein the parts are easily accessible, which eliminates friction as far as possible, which avoids dead centers as far as possible, and which operates smoothly and practically noiselessly. Other objects will appear as the description of the apparatus shown in the accompanying drawings progresses, and other objects will become obvious from the apparatus shown and described below.

My invention resides in combinations and associations and arrangements of parts and elements and in details of construction of parts and elements more fully described below as related to the apparatus shown in the mentioned accompanying drawings and as embodied in the appended claims. It is understood that changes may be made in the structure as well as in the combinations and arrangements and associations shown in the mentioned drawings, within the scope of the appended claims, without departing from the spirit and intent of our invention.

My invention is illustrated, in one principal embodiment, in the mentioned accompanying drawings, in which:

Fig. 1 is a side view of a mechanism embodying the features of my invention and arranged to convert lineal motion into rotary motion or rotary motion into lineal motion. The mechanism shown in Fig. 1 may be called the transmission element.

Fig. 2 is a section of Fig. 1, taken on a vertical plane indicated by the line 2 in Fig. 1, and shows the structure of the ball bearing and the inclination and the tilt thereof.

Fig. 3 is a section of the rotatable member of Fig. 1, taken on a vertical plane indicated by the line 3 in Fig. 1, and shows the tilting of the operating groove more clearly.

Fig. 4 is a plan view of the rotatable member of Fig. 1 and shows the relation of certain axes of the member.

Fig. 5 is a side view, complementary to Fig. 4, of the lower end or portion of the hub of the rotatable member and shows a certain angular division in the hub.

Similar reference characters refer to similar parts throughout the views.

Figure 6:
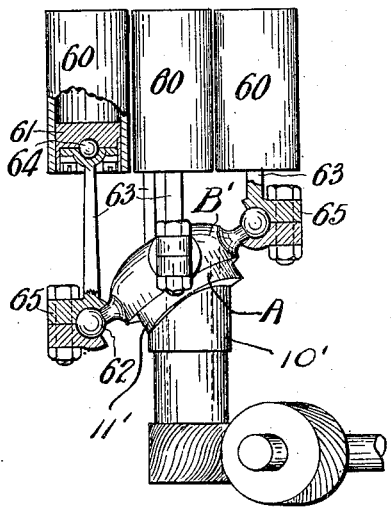
Fig. 6 is a side view, partly in section, of an apparatus embodying the features of my invention and shows four cylinders all arranged in one horizontal plane; the longitudinal axes of the cylinders all arranged in different planes; the motion transmitting element disposed below the cylinders; the cap inverted; and the connecting rods with ball joints at each end.

One type of motion transmitting element to convert lineal motion into rotary motion or rotary motion into lineal motion is shown in Figs. 1 to 5, inclusive.

The mechanism shown here comprises, principally, the rotatable member A, the cap B, the shaft C, and the connectors D.

The member A has the hub 10 and the head 11 and is mounted on the shaft C and is held thereon and movable therewith by means of the screw 12.

The sides 13 and 14 of the head 11 are parallel and the groove E is provided in the head as shown and is parallel with the sides 13 and 14. The groove E is relieved to provide the ball race or operating surfaces 15 and 16. When mechanisms other than balls are used, the groove E can be modified to suit the mechanism used.

The head 11 is disposed at an angle other than a right angle as shown in Fig. 2 and constitutes an inclined plane in this position. Since the groove E is parallel with the sides 13 and 14, the ball races or operating surfaces 15 and 16 also constitute inclined planes.

In addition to the inclined plane described in the paragraph just preceding, the head 11 is also disposed at an angle other than a right angle as shown in Fig. 3 which constitutes a tilt so called to differentiate from the inclined plane described. The inclination of the tilt is effected in a plane angular to the plane of inclination of the inclined plane. Since the groove E is parallel with the sides 13 and 14, the surfaces 15 and 16, as inclined planes, are also tilted.

The angular relations just described (tilted inclined plane) is really a double inclination of the head and the operating surfaces which, for the sake of differentiation and clearly illustrating the structure, may be divided into an inclination and a tilting. The inclination mentioned means the angular relation of the faces 13 and 14 and the surfaces 15 and 16 as shown sectionally in Fig. 2 and the tilting means the angular relation of these faces and surfaces as shown sectionally in Fig. 3; or in other words, the head 11 and the operating surfaces therein are inclined and tilted.

It is quite difficult to show in a drawing or to explain in writing just how the inclination and the tilting of the head 11 is effected. For the purpose of illustration, I have, in Figs. 4 and 5, divided the hub 10 into two parts and show in Fig. 4 a plan view of the upper part of the member A and in Fig. 5 a side view of the lower part of the hub 10.

In Fig. 4 the head 11 is shown without a groove to avoid confusion and is inclined in a plane represented by the line 17. The upper part of the hub 10 being shown (dotted line) below the face 14. The lowest and the highest points of the inclined faces are located in the plane represented by the line 17.

The radial axis 18 is angular with the line 17 with the points 19 and 21 spaced circumferentially from the axis 17. The bottom of the portion of the hub 10 shown in Fig. 4 is inclined on the axis 18 at the same angle as the face 20 in Fig. 5 so that the points 19 are the highest points and the points 21 are the lowest points. Now if the head is rotated on its longitudinal axis until the points 19 and 21 in Fig. 4 register with the points 19 and 21 in Fig. 5 and the two parts are connected together in that position or relation, the head 11 still retains the inclination as shown sectionally in Fig. 2 but will be tilted as shown sectionally in Fig. 3. Due to the angular relation between the axes 17 and 18 and the inclination of the faces 13 and 14 in a plane represented by the line 17 and the inclination of the face 20 in a plane represented by the line 18, the head 11 assumes an angular and a tilted position as shown in other views.

The above explanation should enable others to understand how the member A may be held in a lathe or other machine for the purpose of cutting the groove or to find the various axes to lay out a groove for any general or special purpose.

As above described, the head 11 is inclined and tilted. The inclination of the head may be effected in various manners. As shown in Fig. 2, the head 11 is inclined so that the groove E is eccentric with the longitudinal axis of the motion transmitting element which eccentricity promotes an action similar to a crank action in addition to the action of the balls on the inclined plane. The pins or journals 23 are made sufficiently long to permit the swivel bearings of the connectors D (Fig. 1) to slide inwardly and outwardly on the pins 23 to accommodate the eccentricity when the member A is rotated. The sliding movement just described may be eliminated when the connectors D are provided with ball joints at each end as shown in Fig. 12 for instance.

In the mechanism shown in Figs. 1, 2, 3, 4, and 5, it is clearly illustrated that the walls of the groove are inclined and eccentric and that they are tilted and that the plane of tilting is at an angle to the plane of the inclination. This tilting arrangement provides what may be called a neutral plane at the lowest point of the inclined plane wherein the balls, or other contacting member, are somewhat inactive as far as oscillatory movement of the cap or the lineal movement of a member located at the lowest point is concerned while the balls are more active on the highest point of the inclined plane and thereby eliminates the dead center effect. The eccentric arrangement, coupled with inclination of the operating surface, produces an effect similar to a crank action. When this eccentric arrangement and this inclination is coupled with the tilting arrangement, a crank action without dead centers is attained.

The cap B is circumferentially continuous and of L shape cross-sectionally and has, in the present instance, the ball race 22 and is threaded internally adjacent to the ball race. The operating pins 23 are integral with the cap B.

The ring 24 is externally threaded to engage the internal thread in the cap B and has the ball race 25. The lock washer 26 is placed adjacent to the ring 24 and has the ears 27 extending through slots in the cap B so that the washer 26 always rotates or otherwise moves with the cap B.

The lock ring 28 is externally threaded and also engages the internal thread in the cap B and abuts the washer 26.

The balls 29 are disposed in the groove E in the head 11 and the ball races 22 and 25.

The threaded engagement between the ring 24 and the cap B permits the ring 24 to be moved toward and away from the balls 29 and thereby permits of adjustment between the cap B and the member A to take up any play between these members and thereby aid in eliminating noises as well as attaining smooth running of the apparatus. The washer 26 frictionally contacts the ring 24 and is anchored in the cap B and thereby prevents the ring 24 from rotating in the cap after the same is adjusted therein. The lock ring 28 is screwed tightly against the washer 26 after the ring 24 is adjusted and forces the washer 26 firmly against the ring 24. By this means, adjustment between the cap B and the member A may readily be made and retained. The open end of the cap B is disposed outwardly of the member A so that the adjusting mechanism can be reached and manipulated without disturbing any other part of the apparatus.

The connection members D are operatively connected with the pins 23.

When the member A is rotated, the balls roll around on the races and oscillate the cap B due to the inclination of the races and when the cap B is oscillated, the member A is rotated in the same manner. The oscillatory motion of the cap B produces a lineal motion in the connectors D or a rotary motion in the member A.

In Fig. 6 I have shown an arrangement of four cylinders and a motion transmitting element all well adapted for an explosive engine.

Each of the four cylinders 60 has a piston 61 operable therein and each of the pistons travels in a different plane than the others. All of the cylinders being disposed opposite one end of the member or element E.

In this instance, the general structural details of the member E are the same as those shown in Figs. 1, 2, and 3 except that the ball-shaped journals 62 are substituted for the pins 23 and that the cap B' is inverted or in other words the adjusting means are accessible from below the cylinders where there is plenty of room for adjusting purposes. In inverting the cap B', the heavy explosion and compression pressures find re-action in the solid material of the cap B' and are not transmitted to the threaded members of the element E. In Fig. 6 the members A', B', 10' and 11' correspond to the members A, B, 10 and 11, respectively of Fig. 2.

Each of the connector members 63 has the ball 64 operatively connected with one of the pistons 61 and the ball socket 65 operatively connected with one of the balls 62. This arrangement permits the free oscillation of the cap B' and the free movement of the pistons 61. A guide means, not shown in the drawings, may be provided to prevent the rotation of the cap B'.

As described above, the head on the rotatable member is inclined and tilted. The inclination of the head 11 may be effected in various manners or ways. As shown in Fig. 2, the head 11 is inclined so that the groove is eccentric with the longitudinal axis of the motion transmitting element which eccentricity promotes an action similar to a crank action in addition to the action of the balls on the inclined plane. When operating pins are provided as shown in Fig. 1, they are made sufficiently long to permit the swivel bearings of the connector members to slide inwardly and outwardly on the pins to accommodate the eccentricity of the cap when the rotatable member is rotated. This sliding facility is eliminated when the connectors are provided with ball joints as in Fig. 6 for instance.

As illustrated in the mechanisms shown in the drawings and described in the specification, my invention may be embodied in a very simple structure. The ready means for adjustments assures practically noiseless operation. The crank action produced in the rotatable member is much more efficient than that of the usual crank. The avoidance of dead centers adds materially to the efficiency of an apparatus. The uneven operating surfaces add materially to the efficiency of an apparatus. The entire structure is very simple even with the enormously efficient and advantageous features added.

The fly-wheel 47 is an advantageous adjunct to the rotatable member as well as to the lineally movable member of my invention to steady the rotative movements as well as the lineal movements of members.

I claim:

1. In an apparatus of the character described, a rotatable member having a groove disposed at an inclination with a radial axis of the member, a row of balls in said groove, each of said balls contacting both sides of said groove, a cap on said member and having a ball race contacting one side of each of said balls, a ball race threaded into said cap and contacting the other side of each of said balls, a lock washer in said cap and contacting said ball race and anchored against rotation in said cap, and a lock nut threaded into said cap and contacting said lock washer.

2. In an apparatus of the character described, a lineally movable member, a rotatable shaft, a member rigidly and eccentrically mounted on said shaft having a peripheral groove, a cap extending over a portion of one end of said rotatable member and over said groove, a plurality of contact members held against lateral movement in said cap, each of said contact members contacting the sides of said groove, and connection means between said cap and said lineally movable member.

3. In a mechanical movement for converting reciprocating motion into rotary motion, in combination, a plurality of reciprocable connecting members carrying bearings on their terminating ends, journals encompassed by said bearings, an annular member supporting the inner ends of said bearings, a circular member within said annular member and rotatable within the inner edge thereof, and a rotatable shaft upon which said circular member is rigidly mounted at an inclination, the axis of said shaft passing through a point other than the center of said circular member.

4. In a mechanical movement for converting reciprocating motion into rotary motion, a shaft, a circular member disposed on the shaft, power means associated with said circular member adapted to rotate the same, said circular member being eccentrically mounted on the shaft and inclined thereto, the inclination being such that the plane in which the axis of the shaft and the axis of the power means is disposed, is oblique to the plane of the circular member.

5. In a mechanical movement for changing reciprocating motion into rotary motion, a reciprocatory member, a rotary member including an eccentric wobble plate and a shaft, means connecting said reciprocatory member to said rotary member, said rotary member being mounted upon the shaft in such a manner that when the force acts upon the wobble plate it strikes the wobble plate at its greatest point of eccentricity and the resulting movement of force rotates the rotary member.

In testimony of the foregoing I affix my signature.

CHARLES E. SCHLENKER.